US012558980B2

(12) United States Patent
Morsy et al.

(10) Patent No.: US 12,558,980 B2
(45) Date of Patent: Feb. 24, 2026

(54) INTEGRATED VARIABLE FLUX MEMORY MOTOR CHARGER

(71) Applicant: Jacobi Motors, LLC, Webster, TX (US)

(72) Inventors: Ahmed Morsy, Sugar Land, TX (US); Brian Wightman, Eugene, OR (US)

(73) Assignee: Jacobi Motors, LLC, Missouri City, TX (US)

( * ) Notice: Subject to any disclaimer, the term of this patent is extended or adjusted under 35 U.S.C. 154(b) by 148 days.

(21) Appl. No.: 18/388,330

(22) Filed: Nov. 9, 2023

(65) Prior Publication Data

US 2025/0153586 A1    May 15, 2025

(51) Int. Cl.
| | |
|---|---|
| *H02M 1/42* | (2007.01) |
| *B60L 15/00* | (2006.01) |
| *B60L 50/51* | (2019.01) |
| *B60L 53/22* | (2019.01) |
| *B60L 53/24* | (2019.01) |
| *H02J 7/00* | (2006.01) |

(Continued)

(52) U.S. Cl.
CPC ............. *B60L 53/22* (2019.02); *B60L 15/007* (2013.01); *B60L 50/51* (2019.02); *B60L 53/24* (2019.02); *H02J 7/0068* (2013.01); *H02P 27/12* (2013.01); *B60L 15/025* (2013.01); *B60L 2220/14* (2013.01); *H02J 2310/48* (2020.01)

(58) Field of Classification Search
CPC ...... H02J 7/0068; H02J 2310/48; H02P 27/12
See application file for complete search history.

(56) References Cited

U.S. PATENT DOCUMENTS

| | | | |
|---|---|---|---|
| 3,412,257 | A | 11/1968 | Miller et al. |
| 5,925,965 | A | 7/1999 | Li et al. |

(Continued)

FOREIGN PATENT DOCUMENTS

| | | |
|---|---|---|
| CN | 101232205 A | 7/2008 |
| CN | 103683633 A | 3/2014 |

(Continued)

OTHER PUBLICATIONS

Guangyuan Qiao et al., "Analysis of Magnetic Properties of AlNiCo and Magnetization State Estimation in Variable-Flux PMSMs", IEEE Transactions on Magnetics, vol. 55, Mar. 10, 2019, Total Pages 06.

(Continued)

*Primary Examiner* — Muhammad S Islam
(74) *Attorney, Agent, or Firm* — David L. Cohen

(57) ABSTRACT

An integrated synchronous motor charger includes a battery, and a synchronous motor having a set of phase windings, with each phase winding thereof having an open-ended winding configuration, the synchronous motor being electrically connected to the battery via a bidirectional inverter on a first end of at least one phase winding from the set of phase windings, and to a power source on a second end of the at least one phase winding. The synchronous motor is operably shiftable between a charging mode and a driving mode, the synchronous motor allowing electric power to flow bidirectionally between the power source and the battery in the charging mode, and allowing electric power to flow bidirectionally between the battery and the synchronous motor in the driving mode.

24 Claims, 6 Drawing Sheets

(51) Int. Cl.
   *H02P 27/12*     (2006.01)
   *B60L 15/02*     (2006.01)

(56)         References Cited

U.S. PATENT DOCUMENTS

| | | | |
|---|---|---|---|
| 6,373,162 B1 | 4/2002 | Liang et al. | |
| 6,591,925 B2 | 7/2003 | Raftari et al. | |
| 6,800,977 B1 | 10/2004 | Ostovic | |
| 6,983,897 B2 | 1/2006 | Kulovits et al. | |
| 7,592,766 B2 | 9/2009 | Patel et al. | |
| 7,597,169 B2 | 10/2009 | Borroni-Bird et al. | |
| 7,598,645 B2 | 10/2009 | Ley et al. | |
| 8,217,546 B2 | 7/2012 | Thomas | |
| 8,330,404 B2 | 12/2012 | Sakai et al. | |
| 8,860,356 B2 | 10/2014 | Yuuki et al. | |
| 8,884,576 B2 | 11/2014 | Yuuki et al. | |
| 9,054,566 B2 | 6/2015 | Woolmer | |
| 9,071,117 B2 | 6/2015 | Woolmer | |
| 9,287,755 B2 | 3/2016 | Woolmer et al. | |
| 9,306,423 B2 | 4/2016 | Jang et al. | |
| 9,496,776 B2 | 11/2016 | Woolmer et al. | |
| 9,614,417 B2 | 4/2017 | Lee | |
| 9,692,265 B2 | 6/2017 | Kato et al. | |
| 10,044,237 B2 | 8/2018 | Woolmer et al. | |
| 10,050,480 B2 | 8/2018 | Köhler et al. | |
| 10,063,180 B2 | 8/2018 | Wang et al. | |
| 10,069,385 B2 | 9/2018 | King et al. | |
| 10,069,388 B2 | 9/2018 | Court et al. | |
| 10,224,786 B2 | 3/2019 | Woolmer et al. | |
| 10,566,866 B2 | 2/2020 | Woolmer | |
| 10,608,490 B2 | 3/2020 | Woolmer et al. | |
| 10,608,512 B2 | 3/2020 | Woolmer et al. | |
| 10,630,157 B2 | 4/2020 | Mccaw | |
| 10,826,338 B2 | 11/2020 | Woolmer et al. | |
| 10,848,014 B2 | 11/2020 | Radford et al. | |
| 10,951,075 B2 | 3/2021 | Woolmer | |
| 11,035,458 B2 | 6/2021 | Vu et al. | |
| 11,078,989 B2 | 8/2021 | Yan et al. | |
| 11,146,127 B2 | 10/2021 | Vu et al. | |
| 11,211,845 B2 | 12/2021 | Yan et al. | |
| 11,303,166 B2 | 4/2022 | Yan et al. | |
| 11,342,810 B2 | 5/2022 | Woolmer | |
| 11,387,710 B2 | 7/2022 | Vansompel et al. | |
| 11,479,107 B2 | 10/2022 | Payne et al. | |
| 11,552,516 B2 | 1/2023 | Kim | |
| 11,757,383 B2 | 9/2023 | Lim et al. | |
| 11,804,354 B2 | 10/2023 | Loesch et al. | |
| 11,936,240 B2 | 3/2024 | Leijnen | |
| 11,936,256 B2 | 3/2024 | Radford et al. | |
| 12,040,668 B2 | 7/2024 | Woolmer et al. | |
| 12,057,749 B2 | 8/2024 | Hillman et al. | |
| 12,062,944 B2 | 8/2024 | Echle et al. | |
| 12,062,957 B2 | 8/2024 | Hillman et al. | |
| 12,088,182 B2 | 9/2024 | Echle et al. | |
| 12,119,709 B2 | 10/2024 | Echle et al. | |
| 2006/0170301 A1 | 8/2006 | Masuzawa et al. | |
| 2008/0094013 A1* | 4/2008 | Su | H02P 5/747 |
| | | | 180/54.1 |
| 2008/0292691 A1 | 11/2008 | LLoyd | |
| 2009/0261774 A1 | 10/2009 | Yuuki et al. | |
| 2010/0327787 A1 | 12/2010 | Sakai et al. | |
| 2011/0248594 A1 | 10/2011 | Thomas | |
| 2012/0217834 A1 | 8/2012 | Lutz et al. | |
| 2013/0187492 A1 | 7/2013 | Woolmer | |
| 2013/0234675 A1* | 9/2013 | King | B60L 53/24 |
| | | | 320/163 |
| 2013/0334991 A1 | 12/2013 | Yuuki et al. | |
| 2014/0341764 A1 | 11/2014 | Müller | |
| 2014/0377101 A1 | 12/2014 | Müller | |
| 2015/0004032 A1 | 1/2015 | Müller | |
| 2015/0030479 A1 | 1/2015 | Müller | |
| 2015/0069876 A1 | 3/2015 | Jang et al. | |
| 2015/0314694 A1* | 11/2015 | Alakula | B60L 53/14 |
| | | | 320/109 |
| 2015/0322957 A1 | 11/2015 | Müller | |

| | | | |
|---|---|---|---|
| 2015/0340915 A1 | 11/2015 | Kato et al. | |
| 2016/0172947 A1 | 6/2016 | Kusakabe | |
| 2016/0344242 A1 | 11/2016 | Jang et al. | |
| 2017/0279392 A1 | 9/2017 | Fukushige et al. | |
| 2019/0173336 A1 | 6/2019 | Takeuchi et al. | |
| 2019/0207492 A1 | 7/2019 | Lin et al. | |
| 2019/0296594 A1 | 9/2019 | Nashiki | |
| 2020/0014289 A1 | 1/2020 | Ko et al. | |
| 2020/0076217 A1* | 3/2020 | Filippi | B60L 3/0069 |
| 2020/0195096 A1 | 6/2020 | Loesch et al. | |
| 2020/0328632 A1 | 10/2020 | Radford et al. | |
| 2021/0265880 A1 | 8/2021 | Shinji et al. | |
| 2021/0336519 A1 | 10/2021 | Radford et al. | |
| 2022/0006358 A1 | 1/2022 | Takahashi et al. | |
| 2022/0200423 A1 | 6/2022 | Woolmer et al. | |
| 2022/0286001 A1 | 9/2022 | Leijnen | |
| 2022/0368190 A1 | 11/2022 | Laber et al. | |
| 2022/0407374 A1 | 12/2022 | Radford et al. | |
| 2023/0014696 A1 | 1/2023 | Manke et al. | |
| 2023/0083131 A1 | 3/2023 | Choi et al. | |
| 2023/0223878 A1 | 7/2023 | Woolmer et al. | |
| 2023/0299651 A1 | 9/2023 | Kolehmainen et al. | |
| 2023/0361635 A1 | 11/2023 | Senti et al. | |
| 2023/0361646 A1 | 11/2023 | Moser | |
| 2023/0361659 A1 | 11/2023 | Kolehmainen | |
| 2023/0412057 A1 | 12/2023 | Jang et al. | |
| 2024/0014705 A1 | 1/2024 | Reh et al. | |
| 2024/0055912 A1 | 2/2024 | Kolehmainen | |
| 2024/0055921 A1 | 2/2024 | Kolehmainen | |
| 2024/0088765 A1 | 3/2024 | Leijnen | |
| 2024/0097520 A1 | 3/2024 | Wu et al. | |
| 2024/0097522 A1 | 3/2024 | Peres De Oliveira et al. | |
| 2024/0106285 A1 | 3/2024 | Lee et al. | |
| 2024/0106308 A1 | 3/2024 | Woolmer et al. | |
| 2024/0128810 A1 | 4/2024 | Hong et al. | |
| 2024/0154481 A1 | 5/2024 | Duhaut et al. | |
| 2024/0195245 A1 | 6/2024 | Odling et al. | |
| 2024/0195272 A1 | 6/2024 | Kolehmainen | |
| 2024/0204597 A1 | 6/2024 | Schmolke et al. | |
| 2024/0250565 A1 | 7/2024 | Kolehmainen | |
| 2024/0250567 A1 | 7/2024 | Horvath et al. | |
| 2024/0258846 A1 | 8/2024 | Metz | |
| 2024/0258853 A1 | 8/2024 | Steingass et al. | |
| 2024/0275248 A1 | 8/2024 | Fuchslocher et al. | |
| 2024/0284631 A1 | 8/2024 | Brinkhaus et al. | |
| 2024/0344599 A1 | 10/2024 | Schilder et al. | |
| 2024/0348134 A1 | 10/2024 | Fuchslocher et al. | |
| 2024/0351417 A1 | 10/2024 | Schilder et al. | |

FOREIGN PATENT DOCUMENTS

| | | | |
|---|---|---|---|
| CN | 109586508 A | 4/2019 | |
| CN | 110995085 B | 6/2021 | |
| CN | 109586534 B | 8/2021 | |
| CN | 110098717 B | 11/2021 | |
| CN | 215010005 U | 12/2021 | |
| CN | 112234894 B | 3/2022 | |
| CN | 114337172 A | 4/2022 | |
| CN | 112910130 B | 7/2022 | |
| CN | 114765388 A | 7/2022 | |
| CN | 114928277 A | 8/2022 | |
| CN | 111756145 B | 9/2022 | |
| CN | 113964981 B | 10/2022 | |
| CN | 115347834 A | 11/2022 | |
| CN | 112928956 B | 12/2022 | |
| CN | 217984782 U | 12/2022 | |
| CN | 218040947 U | 12/2022 | |
| CN | 218335697 U | 1/2023 | |
| CN | 109684775 B | 3/2023 | |
| CN | 115864771 A | 3/2023 | |
| CN | 116317248 A | 6/2023 | |
| CN | 116345745 A | 6/2023 | |
| CN | 113783391 B | 7/2023 | |
| CN | 116526793 A | 8/2023 | |
| CN | 117239969 B | 3/2024 | |
| CN | 117674521 A | 3/2024 | |
| CN | 117728643 A | 3/2024 | |
| CN | 110739821 B | 4/2024 | |
| CN | 112688526 B | 4/2024 | |

(56) References Cited

FOREIGN PATENT DOCUMENTS

| | | | |
|---|---|---|---|
| CN | 117856480 A | 4/2024 |
| CN | 117955269 A | 4/2024 |
| CN | 220929692 U | 5/2024 |
| CN | 118372627 A | 7/2024 |
| DE | 102006006824 A1 | 8/2007 |
| DE | 102014211662 A1 | 12/2015 |
| DE | 102014222121 A1 | 5/2016 |
| DE | 102014225985 A1 | 6/2016 |
| DE | 102015202988 A1 | 8/2016 |
| DE | 102015204721 A1 | 9/2016 |
| DE | 102015213678 A1 | 1/2017 |
| DE | 102016203140 A1 | 8/2017 |
| DE | 102017206641 A1 | 10/2018 |
| DE | 102018216967 A1 | 4/2020 |
| DE | 102020004916 A1 | 10/2020 |
| DE | 102021002939 A1 | 7/2021 |
| DE | 102021002941 A1 | 7/2021 |
| DE | 102021002966 A1 | 7/2021 |
| DE | 102020109388 A1 | 10/2021 |
| DE | 102020123345 A1 | 3/2022 |
| DE | 102022001408 A1 | 6/2022 |
| DE | 102021002466 A1 | 11/2022 |
| DE | 102022004792 A1 | 2/2023 |
| DE | 102022004794 A1 | 2/2023 |
| DE | 102022004846 A1 | 2/2023 |
| DE | 102021125982 A1 | 4/2023 |
| DE | 102021130152 A1 | 5/2023 |
| DE | 102021006602 A1 | 6/2023 |
| DE | 102022104375 B4 | 11/2023 |
| DE | 102022205515 A1 | 11/2023 |
| DE | 102022116945 A1 | 1/2024 |
| DE | 102022210416 A1 | 4/2024 |
| DE | 102022004616 A1 | 6/2024 |
| DE | 102022004618 A1 | 6/2024 |
| DE | 102022004622 A1 | 6/2024 |
| DE | 102022004793 A1 | 6/2024 |
| DE | 102023102144 A1 | 8/2024 |
| DE | 102022101633 B4 | 9/2024 |
| DE | 102023107495 A1 | 9/2024 |
| DE | 102023202494 A1 | 9/2024 |
| EP | 2133982 A2 | 12/2009 |
| EP | 2378633 A1 | 10/2011 |
| EP | 2773023 A1 | 9/2014 |
| EP | 3032718 A1 | 6/2016 |
| EP | 3091640 A1 | 11/2016 |
| EP | 2975731 B1 | 2/2018 |
| EP | 2822150 B1 | 10/2019 |
| EP | 3561999 A1 | 10/2019 |
| EP | 3929951 A1 | 12/2021 |
| EP | 3561999 B1 | 1/2024 |
| EP | 3793062 B1 | 5/2024 |
| EP | 4311078 B1 | 7/2024 |
| EP | 4404433 A1 | 7/2024 |
| EP | 4443711 A1 | 10/2024 |
| FR | 2882202 B1 | 7/2007 |
| FR | 3004025 B1 | 3/2015 |
| FR | 3006124 B1 | 5/2015 |
| FR | 3014255 B1 | 1/2016 |
| FR | 2996377 B1 | 7/2016 |
| FR | 2999359 B1 | 7/2016 |
| FR | 3023995 B1 | 8/2016 |
| FR | 3004599 B1 | 10/2016 |
| FR | 3028687 B1 | 1/2018 |
| FR | 3027468 B1 | 5/2019 |
| FR | 3059169 B1 | 8/2022 |
| FR | 3127343 A1 | 3/2023 |
| FR | 3132990 A1 | 8/2023 |
| FR | 3123264 B1 | 10/2023 |
| FR | 3143899 A1 | 6/2024 |
| FR | 3143900 A1 | 6/2024 |
| FR | 3144441 A1 | 6/2024 |
| GB | 2284104 A | 2/2011 |
| GB | 2598007 B | 3/2023 |
| GB | 2627783 A | 9/2024 |
| JP | H02223342 A | 9/1990 |
| JP | H04238005 A | 8/1992 |
| JP | H11168867 A | 6/1999 |
| JP | 2009017694 A | 1/2009 |
| JP | 4337989 A | 9/2009 |
| JP | 4337989 B1 | 9/2009 |
| JP | 2010220400 A | 9/2010 |
| JP | 2013106388 A | 5/2013 |
| JP | 2013106480 A | 5/2013 |
| JP | 2014150638 A | 8/2014 |
| JP | 2014168331 A | 9/2014 |
| JP | 2017200437 A | 11/2017 |
| JP | 6524818 B2 | 6/2019 |
| JP | 6729037 B2 | 7/2020 |
| JP | 6790760 B2 | 11/2020 |
| JP | 6848390 B2 | 3/2021 |
| JP | 6917263 B2 | 8/2021 |
| JP | 6917264 B2 | 8/2021 |
| JP | 7055001 B2 | 4/2022 |
| JP | 2023121030 A | 8/2023 |
| JP | 7458699 B2 | 4/2024 |
| KR | 100580524 B1 | 5/2006 |
| KR | 20140084494 A | 7/2014 |
| KR | 101437546 B1 | 9/2014 |
| KR | 20140118197 A | 10/2014 |
| KR | 20140118203 A | 10/2014 |
| KR | 20140118204 A | 10/2014 |
| KR | 20140119302 A | 10/2014 |
| KR | 20140119304 A | 10/2014 |
| KR | 20150004065 A | 1/2015 |
| KR | 20150019028 A | 2/2015 |
| KR | 20150019057 A | 2/2015 |
| KR | 20160021532 A | 2/2016 |
| KR | 101765581 B1 | 8/2017 |
| KR | 101999860 B1 | 7/2019 |
| KR | 102299449 B1 | 9/2021 |
| KR | 20240083596 A | 6/2024 |
| KR | 20240119616 A | 8/2024 |
| WO | 2004088819 A1 | 10/2004 |
| WO | 2007093233 A1 | 8/2007 |
| WO | 2008062543 A1 | 5/2008 |
| WO | 2013002658 A2 | 1/2013 |
| WO | 2014003730 A1 | 1/2014 |
| WO | 2016005081 A1 | 1/2016 |
| WO | 2017220939 A1 | 12/2017 |
| WO | 2018188948 A1 | 10/2018 |
| WO | 2020078667 A1 | 4/2020 |
| WO | 2020210495 A1 | 10/2020 |
| WO | 2020233936 A1 | 11/2020 |
| WO | 2021081372 A1 | 4/2021 |
| WO | 2021083783 A1 | 5/2021 |
| WO | 2021083784 A1 | 5/2021 |
| WO | 2021176058 A1 | 9/2021 |
| WO | 2022023062 A1 | 2/2022 |
| WO | 2022023139 A1 | 2/2022 |
| WO | 2022023144 A1 | 2/2022 |
| WO | 2022023145 A1 | 2/2022 |
| WO | 2022023146 A1 | 2/2022 |
| WO | 2022023153 A1 | 2/2022 |
| WO | 2022023154 A1 | 2/2022 |
| WO | 2022023158 A2 | 2/2022 |
| WO | 2022023159 A1 | 2/2022 |
| WO | 2022064725 A1 | 3/2022 |
| WO | 2022064726 A1 | 3/2022 |
| WO | 2022069500 A1 | 4/2022 |
| WO | 2022128550 A1 | 6/2022 |
| WO | 2022258314 A1 | 12/2022 |
| WO | 2023001504 A1 | 1/2023 |
| WO | 2023016763 A1 | 2/2023 |
| WO | 2023020863 A1 | 2/2023 |
| WO | 2023078922 A1 | 5/2023 |
| WO | 2023094626 A1 | 6/2023 |
| WO | 2023104480 A1 | 6/2023 |
| WO | 2023104672 A1 | 6/2023 |
| WO | 2023126237 A1 | 7/2023 |
| WO | 2023126353 A1 | 7/2023 |
| WO | 2023126354 A1 | 7/2023 |
| WO | 2023135251 A1 | 7/2023 |
| WO | 2023135252 A1 | 7/2023 |
| WO | 2023165972 A1 | 9/2023 |

(56) References Cited

FOREIGN PATENT DOCUMENTS

| WO | 2023186744 A1 | 10/2023 |
| WO | 2023186859 A1 | 10/2023 |
| WO | 2023194124 A1 | 10/2023 |
| WO | 2023198521 A1 | 10/2023 |
| WO | 2023227297 A1 | 11/2023 |
| WO | 2024003495 A1 | 1/2024 |
| WO | 2024012848 A1 | 1/2024 |
| WO | 2024022675 A1 | 2/2024 |
| WO | 2024027989 A1 | 2/2024 |
| WO | 2024028133 A1 | 2/2024 |
| WO | 2024033235 A1 | 2/2024 |
| WO | 2024046750 A1 | 3/2024 |
| WO | 2024110654 A1 | 5/2024 |
| WO | 2024120778 A1 | 6/2024 |
| WO | 2024120977 A1 | 6/2024 |
| WO | 2024120979 A1 | 6/2024 |
| WO | 2024121489 A1 | 6/2024 |
| WO | 2024132451 A1 | 6/2024 |
| WO | 2024132599 A1 | 6/2024 |
| WO | 2024132600 A1 | 6/2024 |
| WO | 2024132602 A1 | 6/2024 |
| WO | 2024141222 A1 | 7/2024 |
| WO | 2024149678 A1 | 7/2024 |
| WO | 2024175327 A1 | 8/2024 |
| WO | 2024189277 A1 | 9/2024 |
| WO | 2024199787 A1 | 10/2024 |
| WO | 2024199815 A1 | 10/2024 |
| WO | 2024199816 A1 | 10/2024 |
| WO | 2024199838 A1 | 10/2024 |
| WO | 2024213316 A1 | 10/2024 |

OTHER PUBLICATIONS

Hui Yang et al., "Investigation of magnetization characteristics of variable flux PM based on a Fourier-fitting hysteresis model", AIP Advances 9, 095056-1-9, Sep. 26, 2019, Total Pages 10.

Apoorva Athavale et al., "Enabling Driving Cycle Loss Reduction in Variable Flux PMSMs via Closed-Loop Magnetization State Control", IEEE transactions on industry applications, 1932-1939, Oct. 1, 2017, Total Pages 08.

Dean J. Patterson et al., "A comparison of radial and axial flux structures in electrical machines", 2009 IEEE International Electric Machines and Drives Conference, Jun. 16, 2009, Total Pages 07.

Daan Moreels et al., "This Inside-Out Motor for Evs is Power Dense and (Finally) Practical", IEEE Spectrum, Sep. 30, 2019, Total Pages 20.

Bex Sun, "Axial Flux vs Radial Flux: 4 Reasons Why Axial Flux Machines have a Higher Power Density", LinkedIn, Jul. 17, 2019, Total Pages 05.

Chirag Desai et al., "Back EMF, Torque-Angle, and Core Loss Characterization of a Variable-Flux Permanent-Magnet Machine", IEEE Transactions on Transportation Electrification, vol. 5, No. 2, Feb. 21, 2019, Total Pages 14.

International Search Report, PCT/US2021/012938, mailed May 11, 2021, Total Pages 04.

International Search Report, PCT/US2020/027473, mailed Aug. 17, 2020, Total Pages 05.

International Search Report, PCT/US2021/028869, mailed Aug. 3, 2021, Total Pages 04.

International Search Report, PCT/US2020/057140, mailed Feb. 11, 2021, Total Pages 04.

Huang Jia et al., "Vaiable flux Memory Motors: A Review", 2014 IEEE Conference and Expo Transportation Electrification Asia-Pacific, 2014, Total Pages 06.

Lee Teschler, "Innovative electric motors sport axial designs", Designworld, May 25, 2024, Total Pages 05.

Tao Li et al., "Multiphysics Analysis of an Axial-Flux In-Wheel Motor With an Amorphous Alloy Stator", IEEE Access, vol. 8, 27414-27425, Feb. 6, 2020, Total Pages 12.

Written Opinion of the International Searching Authority, PCT/US2021/012938, mailed May 11, 2021, Total Pages 08.

Written Opinion of the International Searching Authority, PCT/US2021/028869, mailed Aug. 3, 2021, Total Pages 09.

Written Opinion of the International Searching Authority, PCT/US2020/057140, mailed Feb. 11, 2021, Total Pages 11.

Hai Xu et al., "Design of a Hybrid Magnets Variable Flux Memory Machine Based on Hysteresis Model", 2019 IEEE International Electric Machines & Drives Conference (IEMDC), 1889-1894, May 12-15, 2019, Total Pages 06.

J. Huang, et al.; "Variable flux Memory Motor: A Review"; 2014 IEEE Conference and Expo Transportation Electrification Asia-Pacific, pp. 1-6; Aug. 31, 2014 (6 pages).

International Search Report for corresponding International Application No. PCT/US2020/027473, mailed Aug. 17, 2020 (20 pages).

Written Opinion issued in International Application No. PCT/US2021/028869; Dated Aug. 3, 2021 (12 pages).

"Analysis of Magnetic Properties of AlNiCo and Magnetization State Estimation in Variable-Flux PMSMs", IEE Transactions on Magnetics, vol. 55, No. 7, Jul. 2019.

Xu Hai et al, "Design of a Hybrid Magnets Variable Flux Memory Machine Based on Hysteresis Model", 2019 IEEE International Electric Machines & Drives Conference (IEMDC), IEEE,May 12, 2019 (May 12, 2019), p. 1889-1894, XP033588597.

International Search Report issued in corresponding International Patent Application No. PCT/US2021/012938 dated Way 11, 2021 (4 pages).

Written Opinion issued in corresponding International Patent Application No. PCT/US2021/012938 dated May 11, 2021 (8 pages).

"Investigation of magnetization characteristics of variable flux PM based on a Fourier-fitting hysteresis model", AIP Advances 9, 095059 (2019); https://doi.org/10.1063/1.1522766.

International Search Report issued in International Application No. PCT/US2021/028869, mailed Aug. 3, 2021 (5 Pages).

International Search Report issued in PCT/US2020/057140 on Feb. 11, 2021 (4 pages).

Written Opinion of the International Searching Authority issued in PCT/US2020/057140 on Feb. 11, 2021 (11 Pages).

Athavale, A. et al.; "Enabling Driving Cycle Loss Reduction in Variable Flux PMSMs via Closed-loop Magnetization State Control"; IEEE, Oct. 1, 2017, pp. 1932-1939 (8 pages).

Desai, C.; "Back EMF, Torque-Angle, and Core Loss Characterization of a Variable-Flux Permanent-Magnet Machine"; IEEE Transactions on Transportation Electrification, vol. 5, No. 2, Jun. 1, 2019, pp. 371-384 (14 Pages).

Lee Teschkler "Innovative electric motors sport axial designs" Designworld, Feb. 6, 2019 (5 pages).

D. J. Patterson et al. "A Comparison of Radial and Axial Flux Structures in Electrical Machines" IEEE, International Electric Machines and Drives Conference; 2009 (7 pages).

T. Li et al. "Multiphysics Analysis of an Axial-Flux In-Wheel Motor With an Amorphous Alloy Stator" IEEE Access, vol. 3;Feb. 13, 2020 (12 pages).

D. Moreels et al. "This Inside-Out Motor for EVs is Power Dense and (Finally) Practical" IEEE Spectrum; Sep. 30, 2019 (8 pages).

Daan Moreels "Axial Flux vs Radial Flux: 4 Reasons Why Axial Flux Machines have a Higher Power Density" Magnax; Jan. 31, 2018 (6 pages).

* cited by examiner

100

200A

200B

200C

400

500A

500B

INTEGRATED VARIABLE FLUX MEMORY MOTOR CHARGER

BACKGROUND

Synchronous electric motors, such as Variable Flux Memory Motors or Wound Field Synchronous Motors, have a wide range of applications in industrial, commercial, and residential, applications, such as fans, pumps, compressors, elevators, and refrigerators, industrial machinery, and electric motor vehicles because of their high efficiencies. Also, because of using permanent magnets instead of windings in the rotors of the synchronous electric motors, there is less need for rotor cooling. These advantages along with others (e.g., being brushless) make the synchronous electric motors popular where high torque, high efficiency, or low maintenance for electric motors is needed.

Many applications require synchronous electric motors to operate on power supplied by batteries. A predominant example of such an application is an electric vehicle, where the motors are powered by rechargeable batteries. Such batteries may be periodically brought to a charging station that provides necessary electric power to charge the batteries. Usually, charging stations provide electric power in the form of single-phase or three-phase Alternating Current (AC), based on the distribution and transmission infrastructure associated with said charging stations.

Since batteries operate on Direct Current (DC), a rectifier (charger) is often used for converting the form of the electric power from AC to DC. Further, external filter inductors are added to the chargers to reduce variations in electric power, thereby ensuring improved efficiency when converting AC into DC. However, external filter inductors add weight and provide an additional point of failure in the charger. Some solutions propose repurposing of coils of the electric motors to function as inductor filters. However, motors generate torque or losses when they are excited with three-phase currents, which is undesirable during charging. Such charging currents also result in the demagnetization of permanent magnets (PM) on the rotors, resulting in a decrease in the motor performance. To use motors as inductor filters, particularly when used in conjunction with three-phase inverters, phase windings of the motor have to be center tapped with all nine terminals of the motor available for connection. In such configurations magnetic fields of the current passing therethrough get canceled out, whereby no torque is generated. However, such configurations lower the effective inductance which increases current ripples. Additionally, such configurations necessitate use of three H-Bridges (i.e. 6 phase inverter). Further, the complexity of such configurations also increases cost of assembling and maintaining, thereby making them less feasible.

In the case of a single-phase excitation, a motor that remains stationary generates a pulsating magnetic field as opposed to the rotating field generated in three-phase excitation scenarios. Consequently, if one or two phases of the motor function as an inductor filter, neither torque nor excessive motor losses are produced. Nevertheless, during single-phase AC/DC energy conversion, power pulses at twice the line frequency. The power flows to the battery should be smooth and devoid of ripples, necessitating a power decoupling mechanism. Existing decoupling mechanisms, however, require additional electronics, thereby contributing to the overall weight and cost of the system.

Therefore, there is a need for an integrated charger capable of charging batteries without generating undesirable torque. Further, there is a need for an integrated charger that displays adaptability concerning the receipt of either single-phase or three-phase electric power for the purpose of battery charging.

SUMMARY

In an aspect, embodiments of the disclosure are directed towards an integrated synchronous motor charger. The charger includes a battery, and a synchronous motor having a set of phase windings, with each phase winding thereof having an open-ended winding configuration. The synchronous motor is electrically connected to the battery via a bidirectional inverter on a first end of at least one phase winding from the set of phase windings, and to a power source on a second end of the at least one phase winding. The synchronous motor is operably shiftable between a charging mode and a driving mode. The synchronous motor is configured to allow electric power to flow bidirectionally between the power source and the battery in the charging mode, and allow electric power to flow bidirectionally between the battery and the synchronous motor in the driving mode.

In another aspect, embodiments of the disclosure are directed to an integrated synchronous motor charger. The charger includes a battery, and a synchronous motor having a set of phase windings, with each phase winding thereof having an open-ended winding configuration. The synchronous motor is electrically connected to a bi-directional inverter on a first end of at least one phase winding from the set of phase windings, and to a power source on a second end of the at least one phase winding. The synchronous motor is operably shiftable between a charging mode and a driving mode. The synchronous motor is configured to allow electric power to flow bidirectionally between the power source and the battery in the charging mode, and allow electric power to flow bidirectionally between the battery and the synchronous motor in the driving mode. Further, the bi-directional inverter has an inverter bus capacitor that operably decouples the at least one phase winding from the set of phase windings to allow the synchronous motor to receive power from the power source in a plurality of phases.

Other aspects of the disclosure will be apparent from the following description and the appended claims.

DETAILED DESCRIPTION

Figure 1:
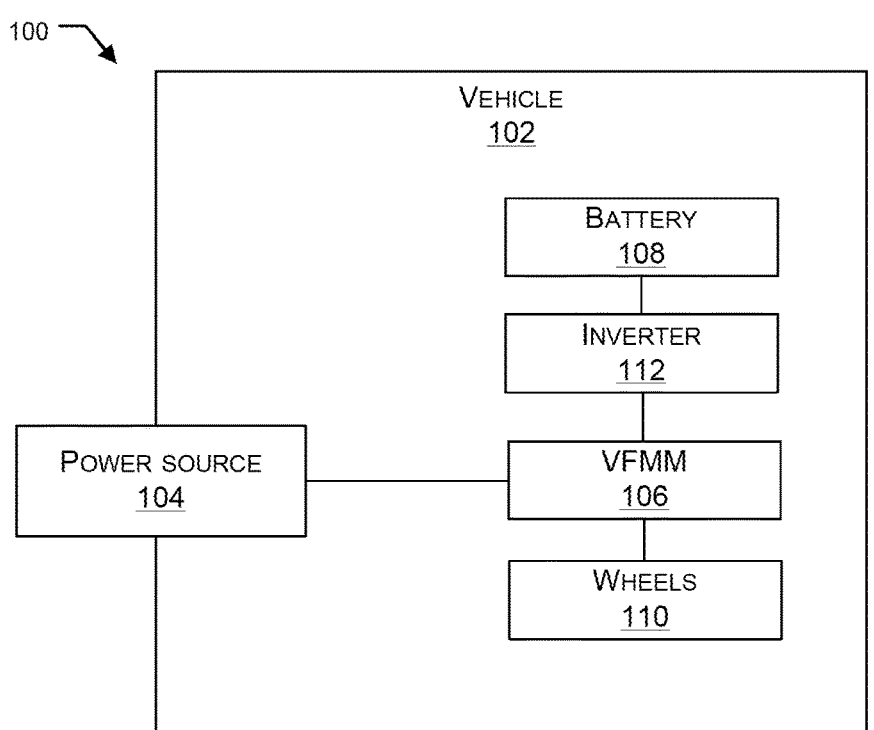
FIG. 1 shows a block diagram of an integrated synchronous motor charger implemented in a vehicle, according to one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it would have been apparent to one of ordinary skill in the art that the disclosure may be practiced without these specific details. In other instances, well-known features have not been described in detail to avoid unnecessarily complicating the description.

As used herein, "about" means approximately or nearly and in the context of a numerical value or range set forth means±10% of the numeric value.

Referring to FIG. 1, a block diagram (100) of an integrated synchronous motor charger implemented in a vehicle (102) is illustrated. As shown, the charger may include one or more synchronous motors, such as Variable Flux Memory Motors (VFMMs) (106), each being configured to a corresponding set of wheels (110). In some configurations, the VFMMs (106) may be configured to propel the vehicle (102) by turning the wheels (110). Further, the charger may include a battery (108) that stores electric power received from a power source (104). While the present disclosure is described in the context of the charger being adapted for automotive implementations, it may be appreciated by those skilled in the art that the charger may also be suitably adapted for other non-automotive applications. Further, while the present disclosure is described in the context of the synchronous motors being VFMM, embodiments of the present disclosure may be suitably adapted for use in other synchronous motors, such as Wound field Synchronous Motor (WFSM).

In one or more embodiments, the vehicle (102) may include, but not be limited to, electric vehicle, hybrid vehicle, and the like. Examples of the vehicle (102) include, but not be limited to, two-wheelers, three-wheelers, cars, vans, trucks, buses, hydraulic vehicles, electric trains, locomotives, boats, ships, and the like. The vehicle (102) may include one or more components configured to provide one or more functionalities. In some embodiments, the components may be selected from a group including, but not limited to, an e-drive motor, starters of a combustion engine, a thermal heater, e-axles, inverters, exhaust pipes, batteries, chargers, compressors, variable frequency drive, and fuel cells associated with the vehicle (102). In some embodiments, the components may be powered by electricity. It may be appreciated by those skilled in the art that the charger may be implemented in any electrical system that requires a motor.

In one or more embodiments, the VFMMs (106) may be indicative of synchronous electric motors whose flux linkage ($\lambda_m$) may be dynamically, and operably, adjustable. The VFMMs (106) may be a type of synchronous motor in which magnetization of rotor magnets of the VFMMs (106) may be adjusted (i.e., changed) during an operation of the VFMMs (106). The adjustment of the magnetization of the rotor magnets (hereinafter, will be referred to as "VFMM magnetization" or "magnetization state" for simplicity) changes the torque generated therefrom when electric power is supplied to the VFMMs (106). According to one or more embodiments, to facilitate the change in the magnetization state of the VFMMs (106), the rotor magnets may be made of a soft-ferromagnetic material including, but not limited to, aluminum nickel cobalt (AlNiCo) or some types of ceramics. Hereinafter, the rotor magnets made of a soft-ferromagnetic material will be referred to as "soft magnets." The soft magnets may be Low Coercive Force Magnets (LCF) that produce magnetomotive forces (mmf) when magnetized. According to one or more embodiments, the soft magnets may be AlNiCo with grades 1-9 or magnets made of AlNiCo, cast, ceramics, some grades of samarium cobalt, or sintered construction of these materials. It may be apparent to those skilled in the art that specific amounts of these materials may be used to achieve a desired function of the VFMMs (106). The design, construction, number, and arrangements of a stator, the rotor, and the soft magnets may the VFMMs (106) may be suitably adapted based on requirements of the use cases. In some examples, the VFMMs (106) may correspond to those provided in patent specifications WO2020210495A1, US20220407374A1, and/or WO2021081372A1.

The VFMMs (106), in accordance with one or more embodiments, are a better substitute for conventional synchronous motors due to their ability to be variably magnetized and demagnetized based on requirements. In one or more embodiments, the soft magnets can be quickly and efficiently magnetized and demagnetized while the soft magnets are assembled inside the motor. Accordingly, using VFMMs (106) potentially reduces manufacturing costs of electric motor-equipped systems due to being magnetized or demagnetized during assembly.

In one or more embodiments, the magnetization states of the soft magnets may be changed to any value from about 0% magnetization (i.e., the soft magnets are completely demagnetized) to about 100% magnetization (i.e., the soft magnets are magnetized to their maximum capacity). The change in the magnetization states may occur in a short time. In one or more embodiments, the magnetization states of the VFMMs (106) may be changed by passing a pulse of current therethrough such that the soft magnets are magnetized or de-magnetized up to the desired level. The level of magnetization of the soft magnets may be adjusted by amplitude of the pulse of current. By suitably adjusting the magnetization states of the VFMMs (106), the VFMMs (106) may be operably shifted between the charging mode and the driving mode. In some embodiments, the VFMMs (106) may allow electric power to flow bidirectionally between the power source (104) and the battery (108) in the charging mode. In such embodiments, the soft magnets may be demagnetized such that the VFMMs (106) are prevented from generating torque when the electric power is supplied thereto. Further, the VFMMs (106) may allow electric power to flow bidirectionally between the battery (108) and the VFMM (106)

in the driving mode. In such embodiments, the soft magnets may be re-magnetized to allow the VFMMs (106) to generate torque. In embodiments where the synchronous motors are indicative of WFSM, a stator and a rotor thereof may be magnetically coupled. The intensity of magnetic fields of the rotor, and correspondingly the magnetic coupling between the stator and the rotor, may be manipulated by controllably varying electric current passed through the rotor.

In one or more embodiments, the synchronous motors may have a set of phase windings. In some embodiments, each phase winding may have an open-ended winding configuration. In some embodiments, the set of phase windings may correspond to the coils on the stator of the VFMMs (106). In some embodiments, each of the phase windings may have a first end and a second end that are open, and do not form a closed circuit. In one or more embodiments, the synchronous motors may be electrically connected to the battery (108) via a bidirectional inverter, such as an inverter (112) shown in FIGS. 2A to 2D on the first end of at least one phase winding from the set of phase windings. In one or more embodiments, the synchronous motors may be electrically connected to the power source (104) on the second end of the at least one phase winding. In some embodiments, the synchronous motors may have 3 phase windings to operate with three-phase electric power supplied from the power source (104).

In one or more embodiments, the VFMMs (106) may include one or more coils wound on the stator. The one or more coils on the stator may correspond to the phase windings of the VFMMs (106). In embodiments where the soft magnets are demagnetized, the coils associated with the stator may provide inductive reactance to the electric power supplied thereto. Since the soft magnets are demagnetized, the VFMMs (106) may be prevented from generating torque or excessive losses when excited by the electric power from the power source (104). In some embodiments, the soft magnets may be demagnetized by passing the pulse of current through the coils associated with the stator. In such embodiments, the VFMMs (106) may operate as a filter inductor when receiving power from the power source (104), thereby reducing the current ripples due to switching of the inverter (112).

In one or more embodiments, in the charging mode, the bi-directional inverter (112) may convert the electric power from the power source (104) indicative of Alternating Current (AC) to Direct Current (DC) for charging the battery (108), or vice versa based on direction of flow of the electric power. In some embodiments, in the driving mode, the inverter (112) converts the DC from the battery (108) to the AC for actuating the synchronous motor, or vice versa based on direction of flow of the electric power. In some embodiments, the inverter (112) may be a multi-phase inverter. In an example, the multi-phase inverter may be a three-phase inverter. In other examples, the multi-phase inverter may be an inverter having more than one phase. In some embodiments, the inverter (112) may be electrically configured between the synchronous motors and the battery (108). In some embodiments, the inverter (112) may be used for re-magnetizing the soft magnets in the VFMMs (106) by controllably passing a pulse of electric current through the VFMMs (106).

In one or more embodiments, the power source (104) may be any power outlet capable of providing electric power either in single-phase or in three-phases. In some embodiments, the power source (104) may be connected to the grid. The form of the electric power supplied by the power source (104) may depend on the distribution or transmission infrastructure associated with the power source (104). In one or more embodiments, the charger may further include an Electro-Magnetic Interference (EMI) filter (204) that suppresses EMI. The EMI filter (204) may be configured between the power source (104) and the synchronous motor.

In embodiments where the power source (104) supplies single-phase electric power, the phase windings of the synchronous motors may be suitably adapted to receive power therefrom. In some embodiments, the charger may include a step-down transformer that lowers voltage of the electric power redirected to the battery (108). In such embodiments, the step-down transformer lowers the voltage of the electric power to a voltage below that of the battery (108). In an example, the battery (108) may have a voltage range of about 350V-400V.

Figure 2A:
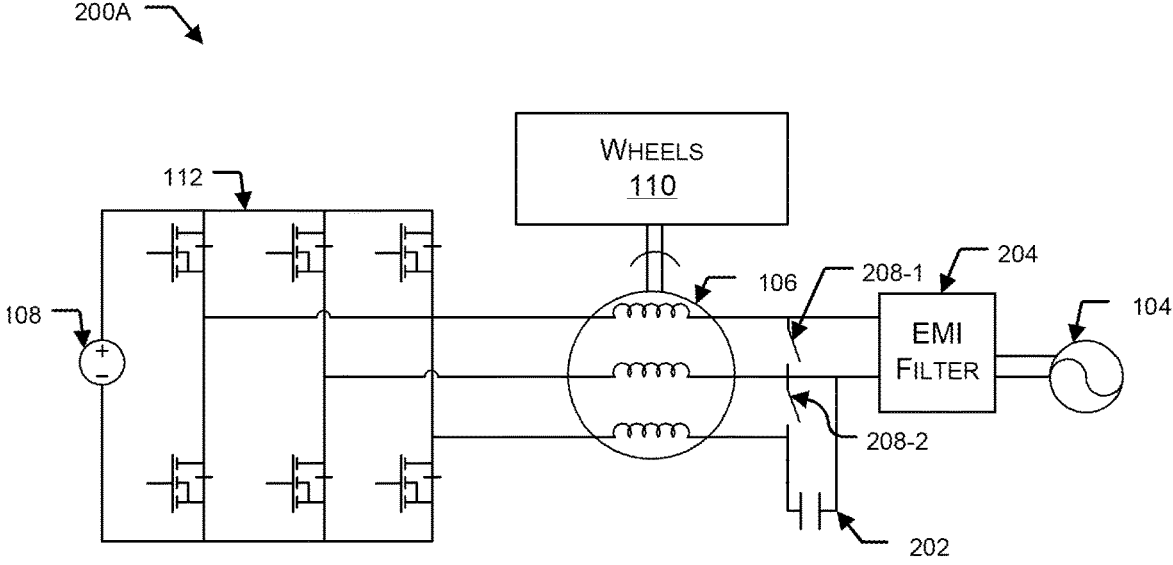
FIG. 2A shows a circuit diagram of the integrated synchronous motor charger having a power decoupling means connected across two phase windings of a synchronous motor for receiving single-phase electric power, according to one or more embodiments.
Figure 2B:
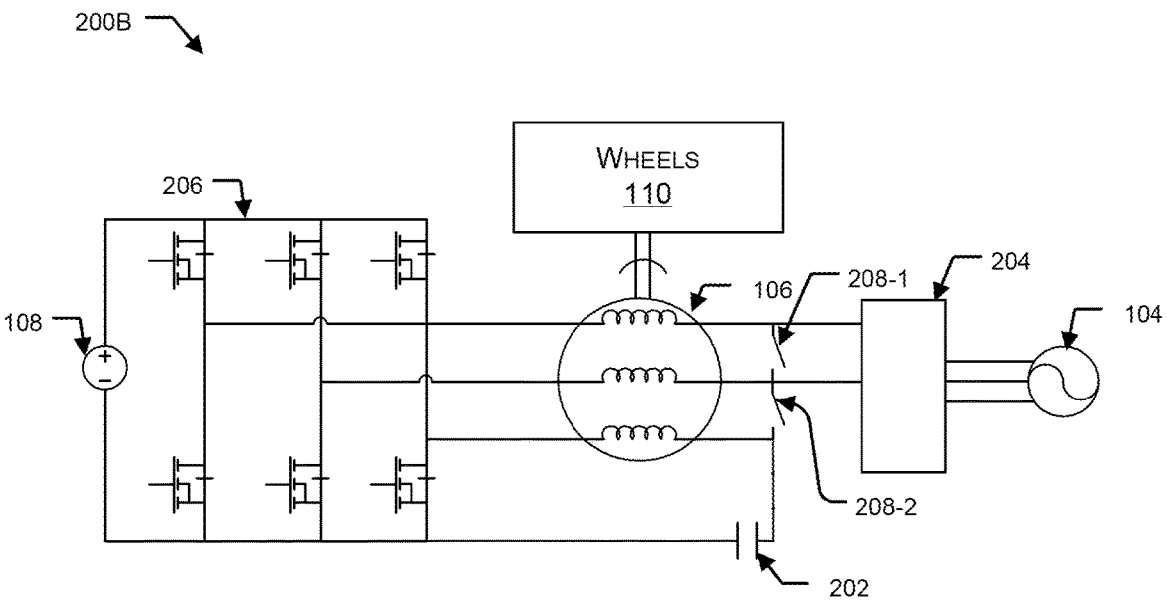
FIG. 2B shows a circuit diagram of the integrated synchronous motor charger having the power decoupling means between at least one phase winding of the synchronous motor and a battery for receiving single-phase electric power, according to one or more embodiments.
Figure 2C:
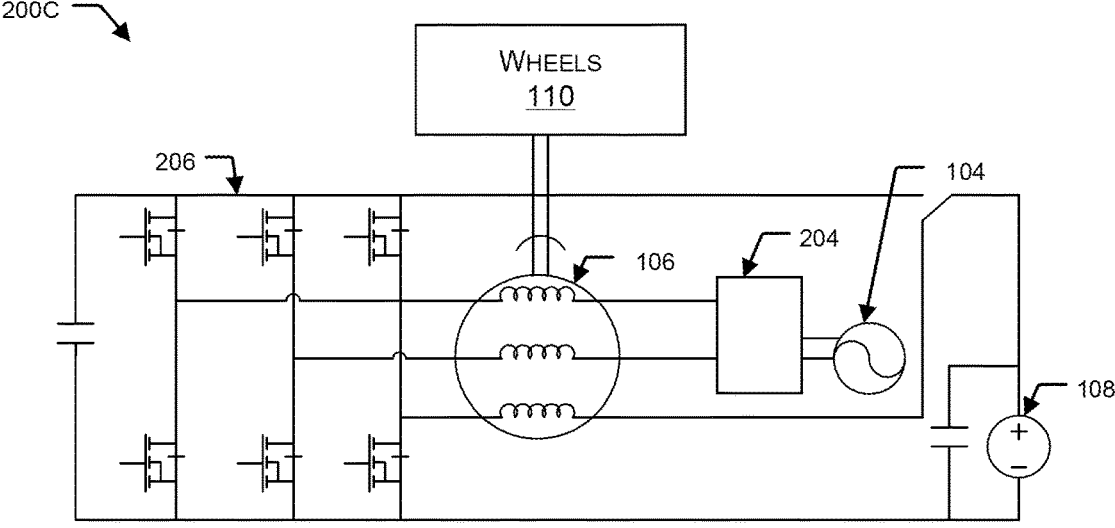
FIG. 2C shows a circuit diagram of the integrated synchronous motor charger having an inverter bus capacitor and a buck-boost converter by connecting at least one phase winding of the synchronous motor to a battery for receiving single-phase electric power, according to one or more embodiments.

Further, the charger may include a power decoupling means, such as a decoupling capacitor (202) shown in FIGS. 2A to 2C, that operably decouples one or more phase windings from the set of phase windings to allow the synchronous motors to receive power from the power source (104) in a plurality of phases. In some embodiments, the decoupling capacitor (202) may allow the synchronous motors to receive single-phase electric power from the power source (104). FIGS. 2A to 2C illustrate embodiments for decoupling the phase windings of the synchronous motor.

Referring to FIG. 2A, a circuit diagram (200A) of the charger having the power decoupling means connected across two phase windings of the synchronous motors are shown. When the synchronous motors have three phase windings, the power decoupling means may be configured across two of the three phase windings, thereby allowing the synchronous motors to receive single-phase electric power from the power source (104).

Referring to FIG. 2B, a circuit diagram (200B) of the charger having the decoupling capacitor (202) connected between at least one phase winding of the synchronous motors and the battery (108) is shown. As illustrated, in one or more embodiments, the decoupling capacitor (202) may be configured on the at least one phase winding from the set of phase windings on the second end of the synchronous motor. In such embodiments, the decoupling capacitor (202) may ground the at least one phase winding such that number of phase windings of the synchronous motors may be compatible with the phase of the electric power supplied by the power source (104). In an example, the decoupling capacitor (202) may be placed on a connection between the at least one phase winding and a negative terminal of the battery (108).

Further, referring to FIG. 2C, a circuit diagram (200C) of an alternative integrated synchronous motors charger having an inverter bus capacitor and a buck-boost converter by connecting at least one phase winding of the VFMM to a battery for receiving single-phase electric power is shown. In another aspect of the present disclosure, the integrated VFMM charger may include, the battery (108) and the synchronous motors having a set of phase windings. In some embodiments, each phase winding thereof may have an open-ended winding configuration. In such embodiments, the synchronous motors may be electrically connected to the bi-directional inverter (112) on the first end of at least one phase winding from the set of phase windings, and to the power source (104) on the second end of the at least one phase winding. In such embodiments, at least one phase winding from the set of phase windings may be connected to the bi-directional inverter (112) on the first end and the battery (108) on the second end.

Further, the bi-directional inverter (112), in such embodiments, may have an inverter bus capacitor that decouples the at least one phase winding from the set of phase windings to allow the synchronous motors to receive power from the power source (104) in a plurality of phases. If the power source (104) supplies single-phase electric power, two of the three phase windings of the synchronous motors may be decoupled to allow the synchronous motors to receive and filter the single-phase electric power, and redirecting the electric power to the battery (108) via the inverter (112).

In one or more embodiments, the charger may include a buck-boost converter configured on the at least one phase winding, the buck-boost converter being configured to lower voltage of the electric power to a voltage below that of the battery (108). In such embodiments, the charger may regulate the power flow to the battery (108), and cancel power ripples at double line frequency.

Figure 2D:
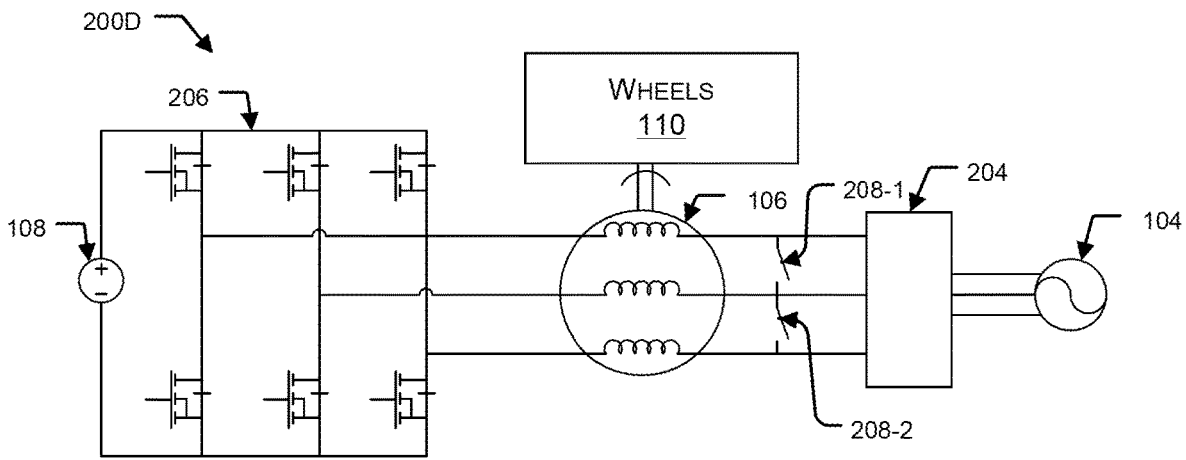
FIG. 2D shows a circuit diagram of the integrated synchronous motor charger adapted for receiving three-phase electric power, according to one or more embodiments.

FIG. 2D shows a circuit diagram (200D) of the charger adapted for receiving three-phase electric power is illustrated. In such embodiments, the synchronous motors may receive the three-phase electric power from the power source (104), filter the electric power, convert the electric power to DC, and use the DC to charge the battery (108).

In the embodiments disclosed in FIGS. 2A to 2D, the soft magnets of the VFMMs (106) may be demagnetized, thereby allowing the VFMMs (106) to operate as filter inductors. Demagnetizing the soft magnets may also prevent the VFMMs (106) from generating torque when the electric power is passed therethrough for filtering.

In typical implementations of the inverter (112), when the synchronous motors consume power from the battery (108) in the driving mode, the synchronous motors may convert electrical power to kinetic energy. In other embodiments, the inverter (112) may be adapted for providing regenerative braking functionality. In such embodiments, the synchronous motors may be operably shifted to a regenerative charging mode, where the synchronous motors may be adapted to convert kinetic energy into AC. The AC may be transmitted through the bi-directional inverter (112) that converts the AC to DC for charging the battery (108). In some embodiments, the charger may further include the power decoupling means that decouples one or more phase windings from the set of phase windings such that number of phase windings of the synchronous motors may be compatible with the bi-directional inverter (112). In some examples, the power decoupling means may decouple two of the three phase windings of the synchronous motors such that said synchronous motors are made compatible with a single-phase inverter (112), thereby further reducing size and weight of the inverter (112).

Figure 3:
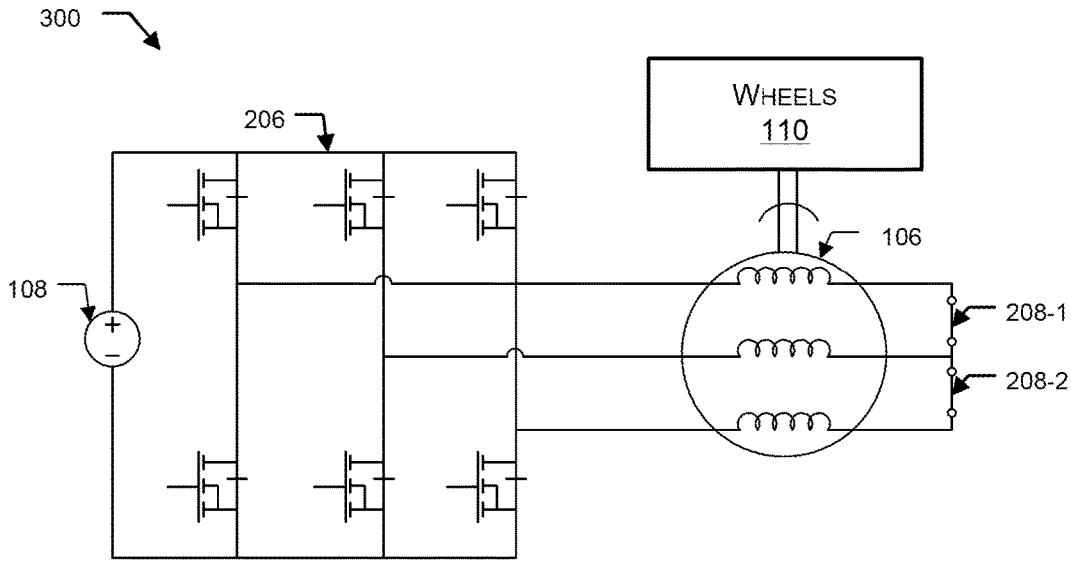
FIG. 3 shows a circuit diagram of the integrated synchronous motor charger in a driving mode, according to one or more embodiments.

FIG. 3 shows a circuit diagram (300) of the integrated VFMM charger in the driving mode, according to one or more embodiments. As shown, the synchronous motors may be closed off from the power source (104) by a first and a second switch (208-1, 208-2) (collectively referred to as switches 208). In one or more embodiments, further may include one or more switches that operably shift the synchronous motors between the charging mode and the driving mode.

In one or more embodiments, the switches (208) may be configured on the set of phase windings between the synchronous motors and the power source (104). In some embodiments, the switches (208) may be operably closed to form a star connection such that the synchronous motors may be disconnected from the power source (104), thereby shifting the synchronous motors to the driving mode. In such embodiments, the synchronous motors may form a closed circuit with the battery (108), and consume power therefrom. The inverter (112) may be configured to convert the DC from the battery (108) to the AC of the required phase for the synchronous motors to consume. In one or more embodiments, one or more switches (208) may be opened to shift the synchronous motors to the charging mode.

In one or more embodiments, the charger may include the switches (208) configured between the synchronous motors and the power decoupling means. In such embodiments, the charger may operably engage or disengage the decoupling capacitor (202) to move between configurations in either FIGS. 2A and 2B, and FIG. 2D, based on the phase of the electric power supplied by the power source (104).

Figure 4:
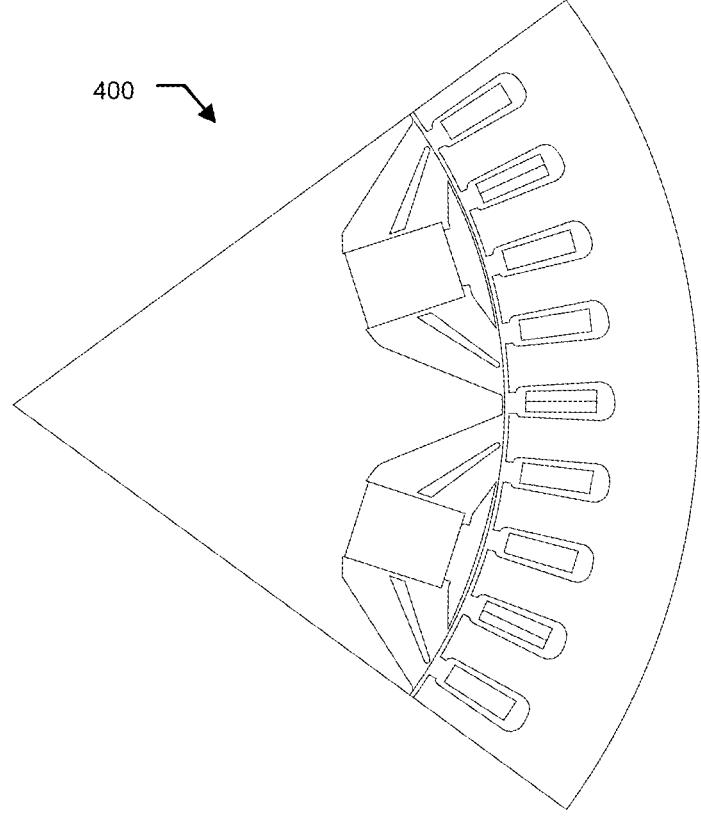
FIG. 4 shows a cross-section view of the Variable Flux Memory Motor (VFMM), according to one or more embodiments.

FIG. 4 shows a cross-section view (400) of the VFMMs (106), according to one or more embodiments. As shown, when the soft magnets of the VFMMs (106) are demagnetized, the VFMMs (106) may be prevented from generating a magnetic field, and, in turn, be prevented from generating torque. In such embodiments, the rotor may be locked in position, thereby allowing the electric power to be filtered without risk of generating torque during charging.

Figure 5A:
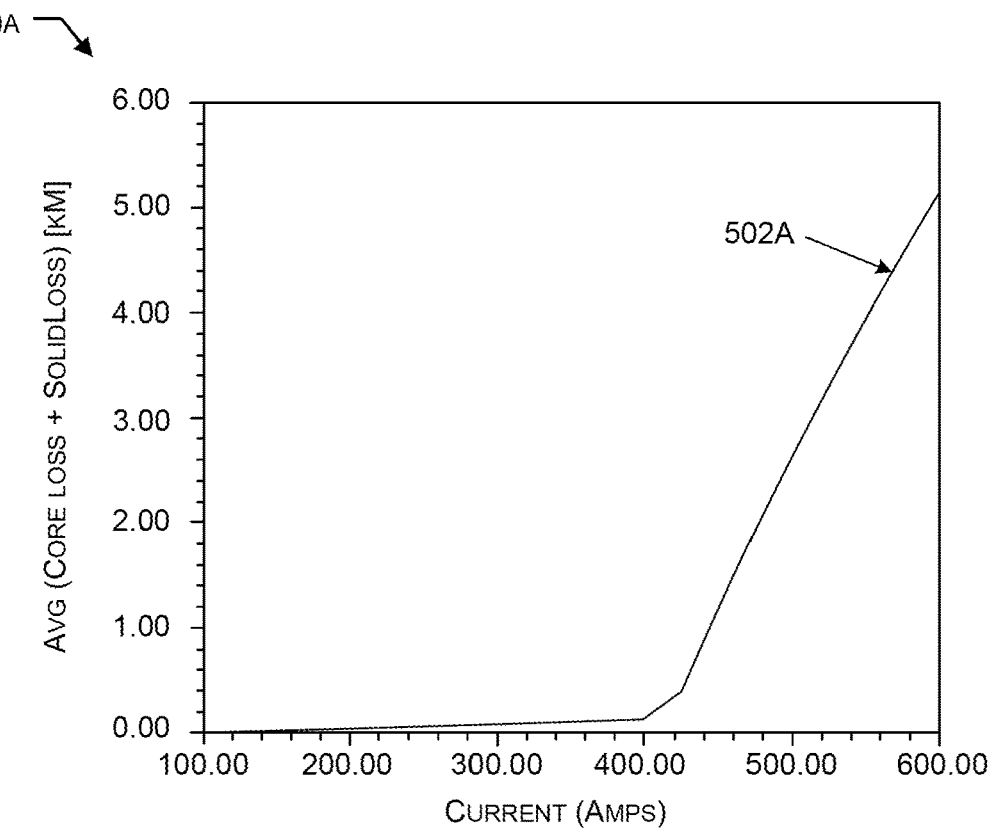
FIG. 5A shows a graphical plot of losses from the VFMM for current supplied thereto, according to one or more embodiments.

FIG. 5A shows a graphical plot (500A) of losses from the VFMMs (106) for current supplied thereto, according to one or more embodiments. The graphical plot (500A) shows a line (502A) indicating the losses at a plurality of magnitudes of the electric current, when the soft magnets are demagnetized. As shown, the losses may be below a predetermined acceptable threshold, when the magnitude of electric current supplied thereto is less than a threshold level. The losses may increase beyond the acceptable threshold as the electric current increases, beyond which the losses may no longer be acceptable. In a preferred example, the losses may be below the acceptable threshold when the electric current is less than about 400 A.

Figure 5B:
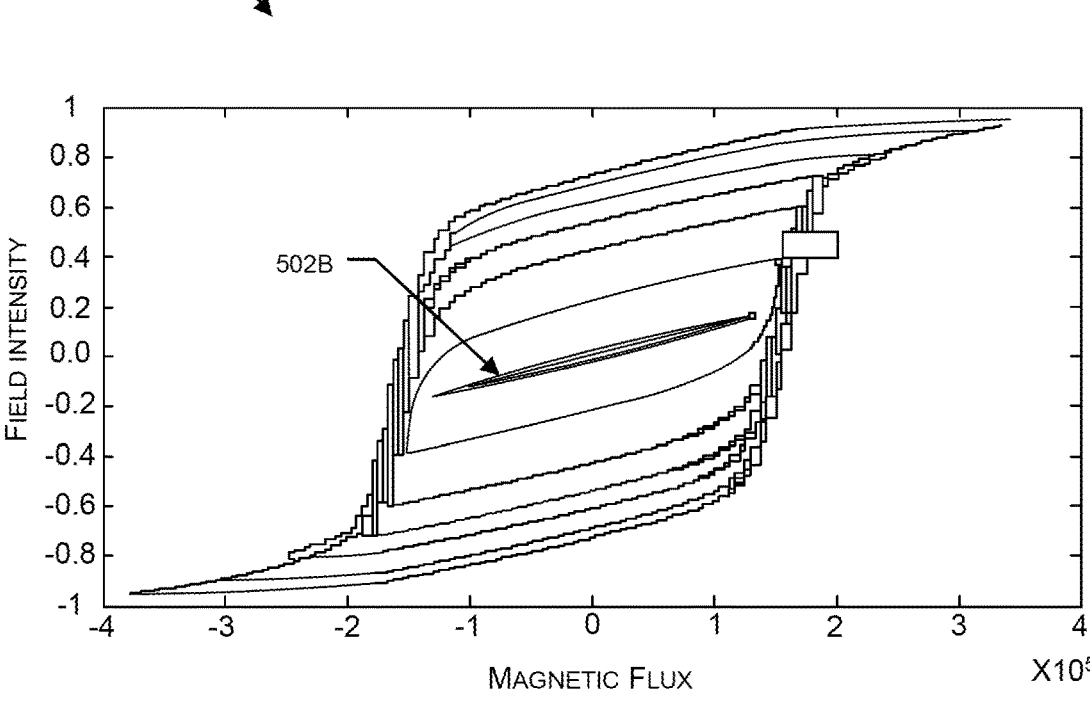
FIG. 5B shows a graphical plot of hysteresis behavior of soft magnets of the VFMM, according to one or more embodiments.

FIG. 5B shows a graphical plot (500B) of hysteresis behavior of soft magnets of the VFMMs (106), according to one or more embodiments. The graphical plot particularly shows the hysteresis behavior of soft magnets made of AlNiCo. As shown, the magnetic hysteresis loops may indicate the field intensity (H) and the magnetic flux (B) oscillates around 0 in a straight line as shown by region (502B), when the electric current is sufficiently low, i.e. less than about 400 A.

Figure 5C:
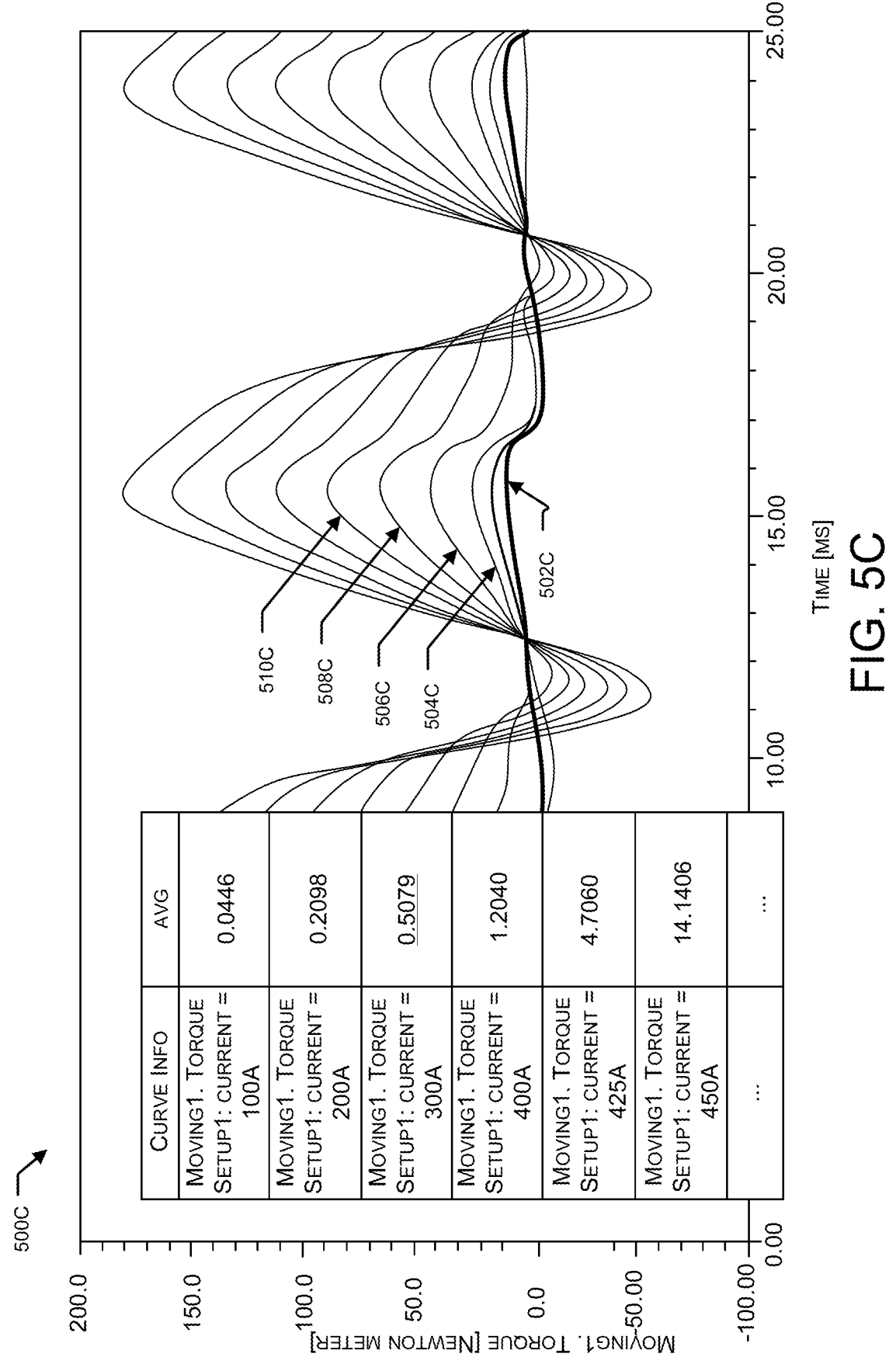
FIG. 5C shows a graphical plot of torque generated by the VFMM when electric power is supplied thereto, according to one or more embodiments.

FIG. 5C shows a graphical plot (500C) of developed torque from the VFMMs (106) for the electric power supplied thereto, according to one or more embodiments. The graphical plot is indicative of a torque plot of the torque generated by the VFMMs (106) with respect to the electric power supplied thereto. As shown, the line plots (502C to 510C) correspond to torques generated at electric currents at 300 A, 400 A, and at 25 A increments from 400 A respectively, within a predetermined interval. The torque generated at up to about 400 A is acceptably low for providing charging functionality, and hence may form the preferred ranges for the electric current.

The use combination of the inverter (112) and the VFMMs (106) in conjunction with the other may allow for charging functionality with a simpler circuit design that requires minimal electronics. Further, the charger of the present disclosure minimizes the weight and complexity of the circuit design thereof, and eliminates need for external inductors. Furthermore, the charger provides for means for charging batteries with both single-phase, as well as three-phase electric power from the power source (104).

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. An integrated synchronous motor charger operating in conjunction with a battery having at least one voltage and a power source including the at least one Alternating Current (AC) line, the power source having at least one power, the charger comprising:

a synchronous motor having a set of phase windings, each phase winding having an open-ended winding configuration, each of the phase windings being coupled with the at least one Alternating Current (AC) line, the synchronous motor being coupled with a bidirectional inverter on a first end of at least one phase winding of the set of phase windings, wherein the synchronous motor is configured to operably shift between a charging mode and a driving mode, the synchronous motor enabling a first flow bidirectionally between the power source and the battery in the charging mode, and enabling a second flow bidirectionally between the battery and the synchronous motor in the driving mode.

2. The integrated synchronous motor charger of claim 1, wherein:

in the charging mode, a rotor of the synchronous motor is configured to a demagnetized state to prevent torque generation; and in the driving mode, the rotor of the synchronous motor is configured to a re-magnetized state using the bidirectional inverter.

3. The integrated synchronous motor charger of claim 1, wherein the synchronous motor comprises at least one coil wound on a stator to provide inductive reactance and to prevent the synchronous motor from generating torque.

4. The integrated synchronous motor charger of claim 1, further comprising a step-down transformer being configured to modify a voltage of the at least one voltage of the battery.

5. The integrated synchronous motor charger of claim 1, further comprising an Electro-Magnetic Interference (EMI) filter being configured to EMI.

6. The integrated synchronous motor charger of claim 1, wherein:

in the charging mode, the bi-directional inverter is configured to convert the Alternating Current (AC) from the power source to Direct Current (DC) for charging the battery, and in the driving mode, the bi-directional inverter is configured to convert the DC from the battery to the AC, the AC being operable to actuate synchronous motor.

7. The integrated synchronous motor charger of claim 1, wherein the synchronous motor comprises a three-phase winding operably configured to receive a three-phase power of the least one power from the power source.

8. The integrated synchronous motor charger of claim 1, further comprising a power decoupler operably configured to decouple the at least one winding from the set of phase windings to operably enable the synchronous motor to receive the at least one power from the power source in a plurality of phases.

9. The integrated synchronous motor charger of claim 1, further comprising at least one switch operably configured to shift the synchronous motor between the charging mode and the driving mode.

10. The integrated synchronous motor charger of claim 1, wherein the synchronous motor is configured to operably shift to a regenerative charging mode, the synchronous motor being operably adapted to generate the Alternating Current (AC), and the bi-directional inverter being operably adapted to convert the AC to a Direct Current (DC) for charging the battery.

11. The integrated synchronous motor charger of claim 1, wherein the synchronous motor comprises a filter inductor to operably filter the at least one power from the power source.

12. The integrated synchronous motor charger of claim 8, wherein the power decoupler comprises a decoupling capacitor.

13. The integrated synchronous motor charger of claim 8, wherein the power decoupler is operably configured on the set of phase windings between the power source and the synchronous motor.

14. The integrated synchronous motor charger of claim 8, wherein the power decoupler is operably configured on the at least one phase winding on a second end of the synchronous motor.

15. The integrated synchronous motor charger of claim 9, wherein the at least one switch is configured on the set of phase windings between the synchronous motor and the power source.

16. The integrated synchronous motor charger of claim 10, further comprising a power decoupler operably configured to decouple a number of phase windings of the synchronous motor corresponding with the bi-directional inverter.

17. The integrated synchronous motor charger of claim 14, wherein the power decoupler is operably configured to ground the at least one phase winding.

18. The integrated synchronous motor charger of claim 15, wherein the at least one switch is operably opened to shift the synchronous motor to the charging mode.

19. The integrated synchronous motor charger of claim 15, wherein the at least one switch is operably closed to form a star connection to disconnect the synchronous motor from the power source and shift the synchronous motor to the driving mode.

20. An integrated synchronous motor charger operating in conjunction with a battery having at least one voltage and a power source including the at least one Alternating Current (AC) line, the power source having at least one power, the charger comprising:

a synchronous motor having a set of phase windings, each phase winding having an open-ended winding configuration, each of the phase windings being coupled with the at least one Alternating Current (AC) line, the synchronous motor being coupled with a bi-directional inverter on a first end of at least one phase winding of the set of phase windings, and coupled to the power source on a second end of the at least one phase winding, the synchronous motor being configured to operably shift between a charging mode and a driving mode, the synchronous motor enabling a first flow bidirectionally between the power source and the battery in the charging mode, and enabling a second flow bidirectionally between the battery and the synchronous motor in the driving mode.

21. The integrated synchronous motor charger of claim 20, wherein the at least one phase winding of the set of phase windings is operably connected to the bi-directional inverter on the first end and the battery on the second end.

22. The integrated synchronous motor charger of claim 20, further comprising a buck-boost converter operably configured on the at least one phase winding, the buck-boost converter being configured to lower a voltage of the least one voltage of the battery.

23. The integrated synchronous motor charger of claim 8, wherein a number of phase windings of the synchronous motor corresponds with a phase of the at least one power of the power source.

24. The integrated synchronous motor charger of claim 20, wherein the bi-directional inverter comprises an inverter capacitor operably configured to decouple the at least one phase winding from the set of phase windings and enable the synchronous motor to receive the at least one power from the power source.

\* \* \* \* \*